Aug. 29, 1950 J. CRAWFORD 2,520,834

DIALING AID FOR DIAL TELEPHONES

Filed Sept. 19, 1949

INVENTOR

Joseph Crawford

BY Kimmel & Crowell

ATTORNEYS

Patented Aug. 29, 1950

2,520,834

UNITED STATES PATENT OFFICE 2,520,834

DIALING AID FOR DIAL TELEPHONES

Joseph Crawford, Washington, D. C.

Application September 19, 1949, Serial No. 116,524

2 Claims. (Cl. 179—90.5)

Figures 1, 2, 3, 4, 5, 6, 7:
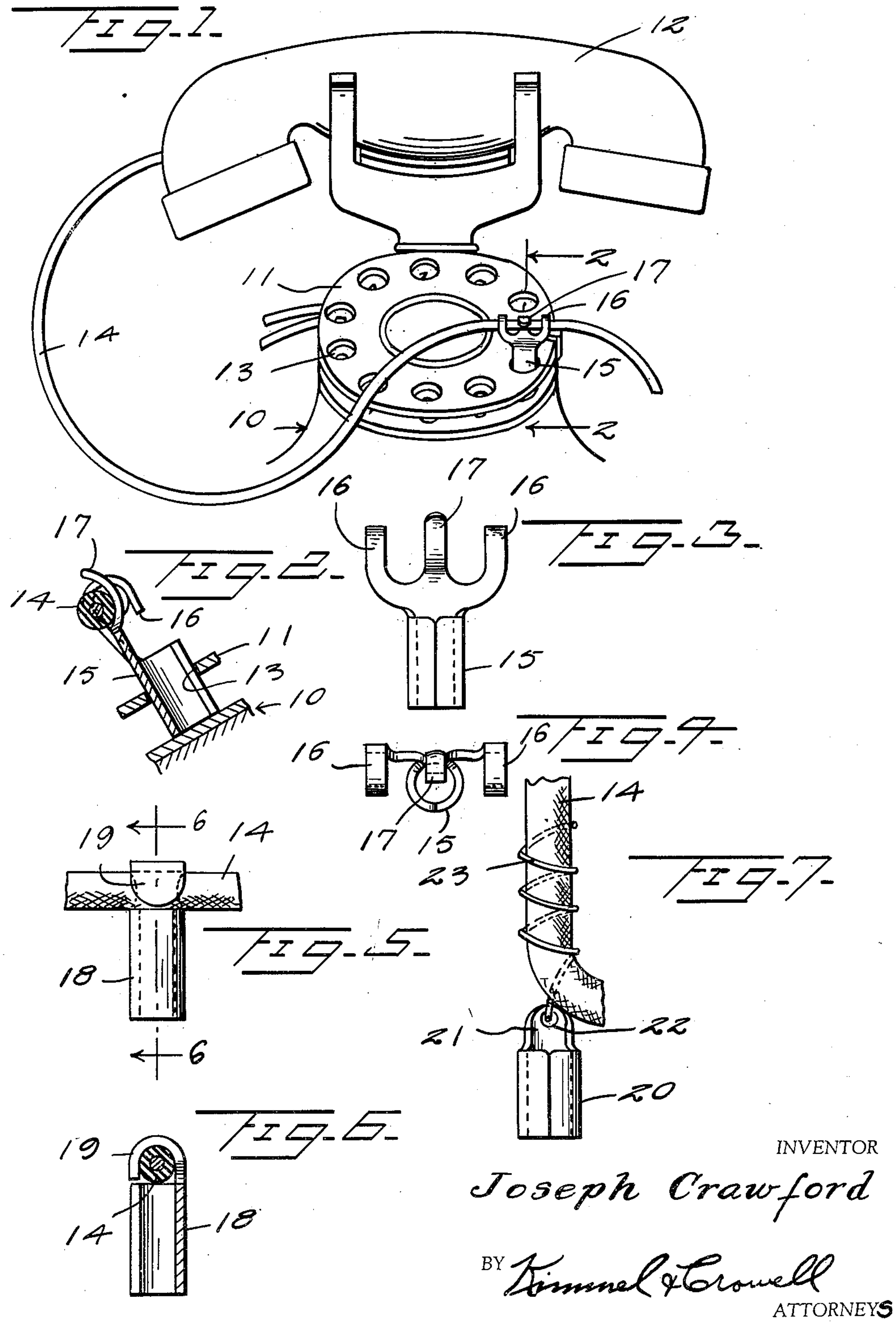

This invention relates to a dialing aid for dial telephones.

An object of this invention is to provide a device for attachment to the cord of a telephone which is adapted to be in a hole of the dial wheel, so that in an emergency the telephone operator may be called by an invalid, bedridden person in the dark or without undue exertion.

Another object of this invention is to provide a device of this kind which can be clipped or otherwise secured to the telephone cord and then inserted in a selected opening of the dial wheel so that an emergency call can be easily and quickly made.

A further object of this invention is to provide a device of this kind which is of simple and inexpensive construction and can be easily attached to the telephone cord without tools.

A further object of this invention is to provide a device of this kind which will not interfere with the normal use of the telephone.

With the above and other objects in view, my invention consists in the arrangement, combination and details of construction disclosed in the drawing and specification, and then more particularly pointed out in the appended claims.

In the drawing,

Figure 1 is a fragmentary perspective view of a dial telephone instrument having a dialing aid constructed according to an embodiment of this invention mounted on the telephone cord, Figure 2 is a sectional view taken on the line 2—2 of Figure 1, Figure 3 is a detail side elevation of the device, Figure 4 is a plan view of the device, Figure 5 is a detail side elevation of a modified form of this invention, Figure 6 is a sectional view taken on the line 6—6 of Figure 5, Figure 7 is a detail side elevation of another modification of this invention.

Referring to the drawing, the numeral 10 designates generally a dial telephone instrument having a rotatable dial wheel 11 formed with a plurality of openings 13. The instrument 10 includes a combined transmitter and receiver 12 having a cord 14 extending therefrom and connected to the instrument member 10.

In order to provide a means whereby an invalid or the like may rotate the dial wheel 11 in an emergency in the dark, I have provided a cylindrical member 15 which is engageable in one of the wheel openings 13. The cylindrical member 15 has extending from the upper end thereof a pair of cord clamping hooks 16 which are spaced apart and the cylindrical member 15 also has an intermediate hook 17 positioned between the hooks 16 and oppositely disposed with respect to the hooks 16 so that the cord 14 will be clamped by the clamping hooks 16 and 17.

Referring now to Figures 5 and 6, there is disclosed a modified form of this invention wherein a cylindrical member 18 has extending from the upper end thereof a hook or strap 19 which is adapted to be bent in clamping position about the cord 14.

Referring now to Figure 7, there is disclosed another modification of this invention embodying a cylindrical member 20 engageable in a selected dial wheel opening, and the cylindrical member 20 has extending from the upper end thereof an extension 21 formed with a hole 22. A spiral cord clamping member or wire 23 is pivotally carried by the extension 21, engaging in the opening 22 and the clamping member 23 is adapted to be wrapped about the cord 14, as shown in Figure 7. By providing the cord clamping member 23 as shown in Figure 7, the cord 14 can be rocked relative to the cylindrical member 20 and the cord will not be injured by the formation of a kink or the like therein in the region of the cord clamping means.

In the use of this dialing aid the clamping members 16 and 17 of the device shown in Figures 1 to 4 inclusive, are clamped about the cord 14 at a point spaced from the instrument 10 so that the cord 14 may have a relatively long loop therein. The cylindrical member 15 is positioned in the dial wheel opening 13 which overlies the "operator" indication so that if it is necessary or advisable for a person to call the operator in an emergency, the instrument 12 may be lifted from the cradle with the cylindrical member 15 engaged in the "operator" hole of dial wheel 11. The member 15 or 18 or 20 with regard to the several forms herein illustrated and described, is in the use of this device, inserted in the dial hole after the dial has first been rotated to the position where its release will result in automatically dialing the operator. The action is then, that by reason of conversion to the receiver cord at a suitable point thereof, the mere lifting of the instrument will pull out the member (15 or 18 or 20) and the dial will then itself rotate to call the operator. Thus the member acts in a manner as to form a temporary dial position lock, instantly releasable.

I do not mean to confine myself to the exact details of construction herein disclosed, but claim all variations falling within the purview of the appended claims.

What I claim is:

1. A device for use with a dial telephone, comprising a plug of a diameter adapted to fit snugly within an opening in a telephone dial and adapted to be positioned in said opening of the dial wheel after the wheel has been rotated to a predetermined position to secure said dial wheel in said position and means securing said plug to the receiver cord whereby removal of the receiver from its cradle disengages said plug to permit rotation of the dial.

2. The construction of claim 1 wherein the plug comprises a metal stamping rolled to form a tubular cylindrical member and hook means on said cylindrical member adapted to be secured about said cord.

JOSEPH CRAWFORD.

REFERENCES CITED

The following references are of record in the file of this patent:

UNITED STATES PATENTS

| Number | Name | Date |
|---|---|---|
| 227,055 | Raughtigan | Apr. 27, 1880 |
| 673,658 | Lawler | May 7, 1901 |
| 897,565 | Walker | Sept. 1, 1908 |
| 1,336,859 | Reihing | Apr. 13, 1920 |
| 1,694,429 | Peak | Dec. 11, 1928 |
| 1,725,610 | Bye | Aug. 20, 1929 |
| 1,794,233 | Hunter | Feb. 24, 1931 |
| 2,245,375 | Wiley | June 10, 1941 |
| 2,314,354 | Jefferson | Mar. 23, 1943 |
| 2,371,051 | Kendig | Mar. 6, 1945 |
| 2,428,135 | Anderson | Sept. 30, 1947 |